Sept. 7, 1965
G. E. McMAKEN
3,204,734
CONTROL DEVICE FOR MAINTAINING A PREDETERMINED THROTTLE SETTING
Filed May 21, 1962
3 Sheets-Sheet 1
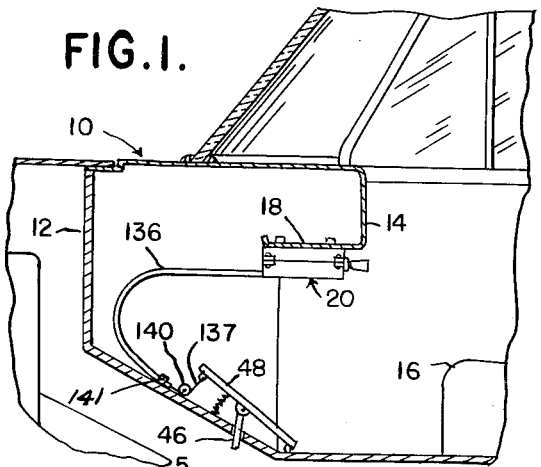
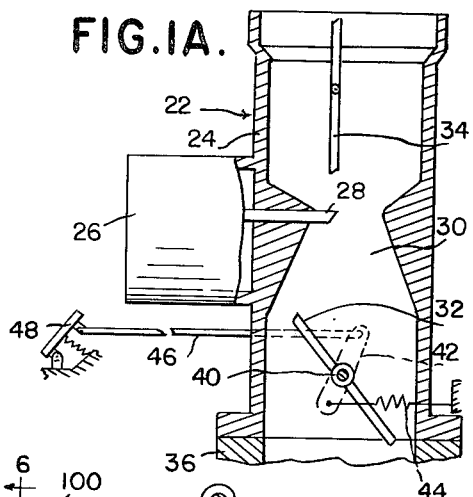
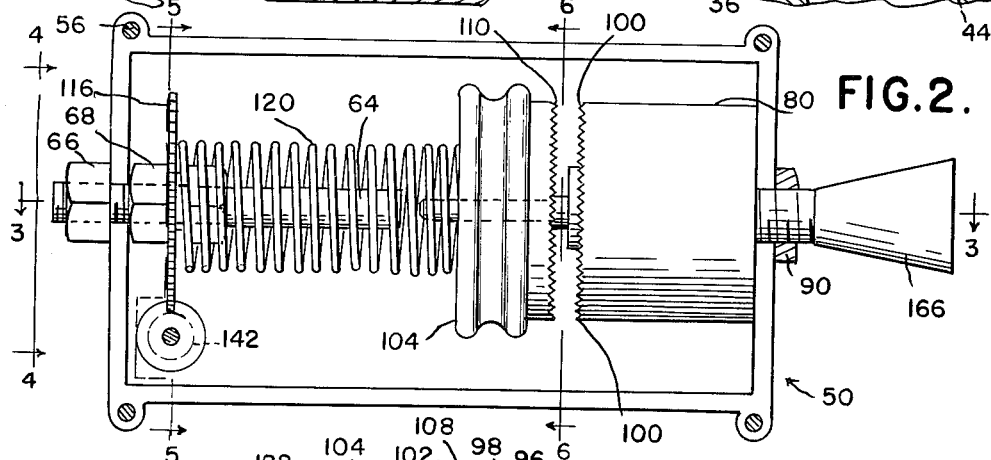
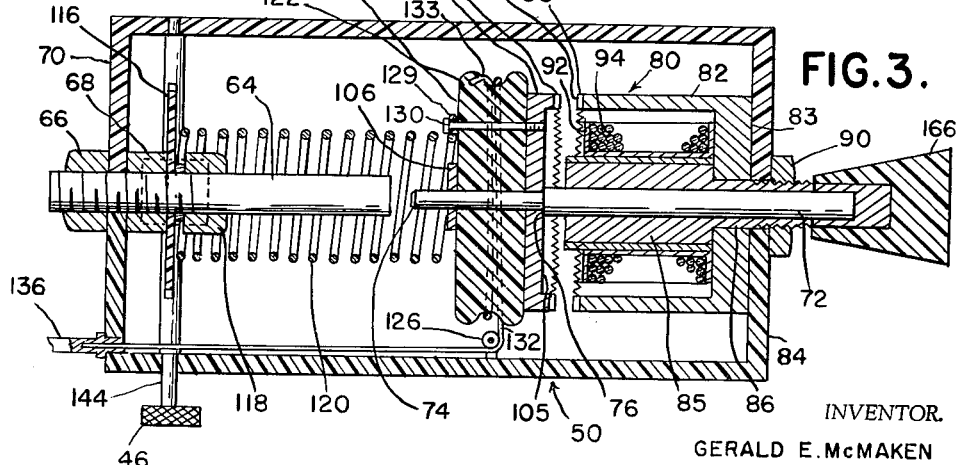
INVENTOR.
GERALD E. McMAKEN
BY Whittemore, Hulbert & Belknap
ATTORNEYS Sept. 7, 1965  G. E. McMAKEN  3,204,734
CONTROL DEVICE FOR MAINTAINING A PREDETERMINED THROTTLE SETTING
Filed May 21, 1962  3 Sheets-Sheet 2

INVENTOR.
GERALD E. McMAKEN
BY
Whittemore, Hulbert
& Belknap
ATTORNEYS

Sept. 7, 1965   G. E. McMAKEN   3,204,734
CONTROL DEVICE FOR MAINTAINING A PREDETERMINED THROTTLE SETTING
Filed May 21, 1962   3 Sheets-Sheet 3

INVENTOR.
GERALD E. McMAKEN
BY Whittemore, Hulbert
& Belknap
ATTORNEYS 3,204,734
CONTROL DEVICE FOR MAINTAINING A PREDETERMINED THROTTLE SETTING
Gerald E. McMaken, 200 Hospital Ave., Stuart, Fla.
Filed May 21, 1962, Ser. No. 196,294
31 Claims. (Cl. 192—3)

The present invention relates generally to a throttle positioning system for an internal combustion engine and refers more specifically to control means for maintaining any selected throttle setting or vehicle speed.

In traveling relatively long distances, particularly on the modern freeways and expressways, the driver of an automobile is generally required to use the conventional accelerator pedal to maintain a constant speed over considerable periods of time, the constant speed being only occasionally interrupted for passing. The continued use of the operator's leg and foot to hold the accelerator pedal in a fixed position results, in numerous cases, in considerable fatigue to the driver.

Various devices have been utilized in the past to hold the throttle of the internal combustion engine in a desired position and thus to relieve the driver of fatigue or various body stresses. However, such devices in the prior art all contain certain inherent undesirable characteristics which have made the devices unsuitable or unsafe for modern driving. A time lag between when the accelerator pedal is depressed for acceleration and when the engine responds, and the necessity of re-setting the speed selector or throttle control device after acceleration occurs are but two of these undesirable characteristics.

It is an object of the present invention to provide a throttle control device for maintaining any selected throttle setting or vehicle speed.

Another object of the present invention is to provide throttle control means for maintaining vehicle speed which does not in any way affect the responsiveness of the engine nor requires re-setting after acceleration occurs.

Still another object of the present invention is to provide a throttle control device which can be set to hold the throttle of an internal combustion engine in any selected or desired open position, and which will immediately become inoperative so as to release the throttle in the event an electrical failure or like trouble should develop in the control mechanism. With such an arrangement full control of the throttle by the vehicle operator is maintained by means of the standard operator control mechanism thereby providing a fail safe system.

A further object of the present invention is to provide a device, system or the like for holding the throttle of an internal combustion engine in any selected minimum open position without interfering with acceleration of the vehicle by the driver or control of the throttle at any point beyond the aforesaid selected minimum open position.

A still further object of the present invention is to provide a throttle control device or system of the aforementioned types which can be effectively controlled and which can be rendered completely inoperative or ineffective immediately upon application of the brakes, the opening of the ignition switch, or by manually breaking the electrical control circuit.

Another object of the present invention is to provide a throttle control device comprising a housing having a fixed shaft and a movable shaft, a solenoid around the movable shaft, said solenoid including a casing having a plurality of teeth thereon, an armature fixedly mounted on the movable shaft and having a plurality of teeth thereon opposite from the teeth on the casing, means operatively connecting the movable shaft to a throttle of an internal combustion engine, current carrying extensible resilient means interposed between the fixed shaft and the armature, and means for shifting the movable shaft to urge the teeth on the armature into interlocking engagement with the teeth on the casing so as to energize the solenoid, said solenoid when energized being effective to hold the movable shaft and armature against movement and to prevent the throttle from closing beyond a predetermined throttle setting.

Still another object of the present invention is to provide a throttle control device of the aforementioned type wherein the resilient means such as a spring is effective to disengage the teeth of the casing and the armature upon the de-energization of the solenoid.

A further object of the present invention is to provide a throttle control device of the aforementioned type wherein means are provided for varying the effectiveness of the resilient means, a tension spring or the like.

A still further object of the present invention is to provide a throttle control device of the aforementioned type wherein the means for varying the effectiveness or tension of the resilient means includes a rotatable gear on the fixed shaft to which the resilient means is connected, and a manually operatable worm gear carried by the housing for changing the angular position of the gear on the fixed shaft.

Another object of the present invention is to provide a throttle control device of the aforementioned type wherein the means operatively connecting the movable shaft to the throttle includes a pulley on the movable shaft and a taut cable on the pulley operatively connected to the throttle, said cable being adapted to rotate the pulley and movable shaft prior to the energization of the solenoid in response to the movement of the throttle.

Still another object of the present invention is to provide a throttle control device of the aforementioned type wherein the pulley is located between the armature and the resilient means, and a threaded fastener extends through a loop provided in the resilient means, said pulley, and into the armature to electrically connect the resilient means to the armature.

Another object of the present invention is to provide a relatively simple, inexpensive, and easily serviceable throttle control device of the aforementioned type which can be readily installed in a vehicle without any substantial change or modifications being required in the conventional throttle control mechanism of the vehicle.

Further objects and advantages of the present invention will be apparent from the following description, reference being had to the accompanying drawings wherein a preferred form of the present invention is clearly shown.

FIGURE 1 is a fragmentary view of an automobile, partly in section, illustrating the manner in which the throttle control device is mounted in the interior of the automobile.

FIGURE 1A is a vertical sectional view illustrating a carburetor mounted on an internal combustion engine having a throttle and the usual control mechanism for controlling the position of the throttle.

FIGURE 2 is an elevational view of the throttle control device with a wall of the housing removed so as to expose the interior thereof.

FIGURE 3 is a horizontal sectional view of the throttle control device taken on the line 3—3 of FIGURE 2.

Figure 4:
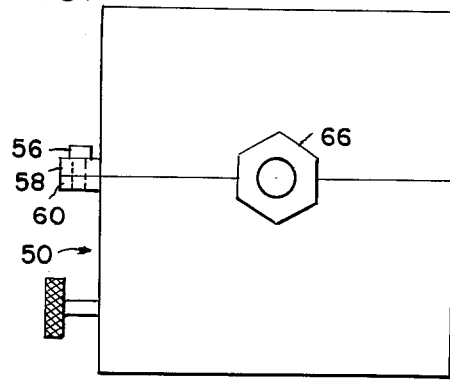
FIGURE 4 is an end view of the throttle control device looking in the direction of arrows 4—4 of FIGURE 2.

Referring now in greater detail to FIGURES 1 and 2, an automobile is represented by the numeral 10. The automobile 10 includes the usual fire wall 12, instrument panel or dash 14, and front seat 16 on which the operator or driver of the vehicle normally sits. The instrument panel 14 includes an integral substantially horizontal flange 18 on which the throttle control device 20, which forms the subject matter of the present invention, is appropriately mounted by bolts, straps, brackets, or the like.

The automobile 10 includes a carburetor 22 which has a body 24, a fuel bowl 26, and nozzle 28 discharging into an induction passage 30. The induction passage 30 has a throttle 32 and choke valve 34 therein. The carburetor 22 is mounted on the intake manifold 36 of an internal combustion engine such that the induction passage 30 is in fluid communication with the inlet manifold 36.

The throttle valve 32 is rigidly secured to the throttle shaft 40 which in turn has an arm 42 secured thereto. The throttle or throttle valve 32 is urged toward a substantially closed position by the usual throttle return spring 44. The arm 42 is connected through appropriate throttle linkage mechanism 46 to the usual accelerator pedal 48. The pedal 48 is pivotally mounted in the usual manner in the interior of the automobile 10 as best illustrated in FIGURE 1.

Referring now to the embodiment illustrated in FIGURES 2–6, the throttle control device 20 includes a housing 50 comprising a lower section 52 and an upper section 54 as best illustrated in FIGURE 4. After the component parts of the control device 20 are appropriately mounted in the lower section 52 of the housing 50, the upper section 54 is placed over the lower section and appropriately connected thereto by means of a plurality of threaded bolts 56 which extend through abutting flanges 58 and 60 which are provided on the upper section 54 and lower section 52 respectively. It should be understood that various fastening means may be utilized for securing the housing parts or sections together.

Located in the housing 50 is a shaft 64. The shaft 64 is threaded at the outer end thereof and is fixedly mounted in the housing 50 by a pair of threaded nuts 66 and 68 which are adapted to bear against the opposite sides of the end wall 70 of the housing 50. Mounted along the same longitudinal axis of the shaft 64 is a movable shaft or rod 72. The shaft 72 is movably carried by the housing 50 for rotation and axial movement as will subsequently appear. The inner end of the shaft 72 is reduced in diameter as indicated by numeral 74. The shaft 72 includes an annular abutment 76 adjacent the reduced portion 74 of the shaft 72.

A solenoid 80 having a casing 82 is mounted in the housing 50 and has an end wall in engagement with the inner surface of the wall 84 of the housing 50. The casing 82 is cup-shaped as best illustrated in FIGURE 3. The solenoid 80 includes a core 85 which is reduced in diameter so as to provide a stem 86, which is threaded, which extends outwardly through the wall 84. The core 85 is tubular, is concentric with and surrounds the movable rod 72. The core 85 and casing 82 are held in a predetermined fixed position in the housing 50 by means of a threaded lock nut 90 which is threadedly secured to the threaded stem 86 and adapted to draw the core 85 against the end wall 83 of the casing 82 so as to retain the solenoid 80 in a fixed position within the housing 50.

Mounted on the main portion of the core 85 is a bobbin 92 around which is wound in the usual manner an electrical coil 94 as is well known in the art. It should be observed that the free or open end 96 of the casing 82 is provided with an annular face 98. The annular face 98 is provided with a plurality of serrations or teeth 100 as best illustrated in FIGURES 2 and 3. As an example, 80 teeth may be utilized. One wire of the coil 94 is attached internally to the core 85 while another wire of the coil 94 is connected to the cold side of the stop light switch as will be subsequently explained.

Fixedly mounted on the reduced portion 74 of the shaft 72 are an armature 102 and a pulley 104. The pulley 104 is generally made from a plastic material and has an outside diameter slightly larger that the outside diameters of the armature 102 and casing 82 which are substantially equal. The inner surface 105 of the armature 102, which is also cup-shaped, is held against the shoulder 76 provided on the shaft 72 by means of a snap lock ring 106 or the like which is effective to hold the pulley 104 and armature 102 in a fixed position on the shaft or rod 72 as best illustrated in FIGURE 3. The free or open end of the armature 102 is provided with an annular face 108 which is provided with a plurality of serrations or teeth 110, equal in number to the number of teeth 100 provided on the casing 82 of the solenoid 80. The teeth 110 are directly opposite from the teeth 100 and are adapted to be urged or moved into interlocking engagemennt with the teeth 100 upon the attainment of a predetermined throttle setting as will be subsequently described.

A worm gear 116, which may be made from a plastic material, is mounted on the fixed shaft 64 for rotation only and is held against the abutment or nut 68 by means of an abutment or nut 118 which is threaded on the fixed shaft 64.

Figure 5:
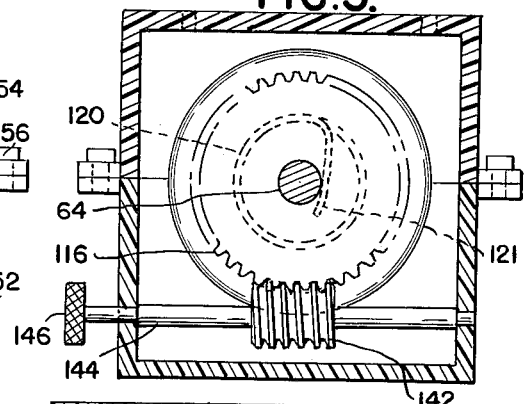
FIGURE 5 is a transverse view, partly in section, taken substantially on line 5—5 of FIGURE 2.
Figure 6:
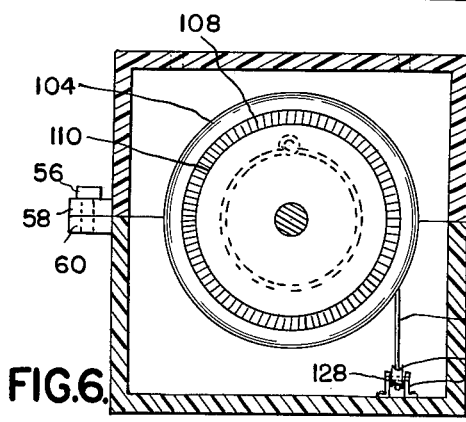
FIGURE 6 is a transverse sectional view, partly in section, taken substantially on line 6—6 of FIGURE 2.
Figure 10:
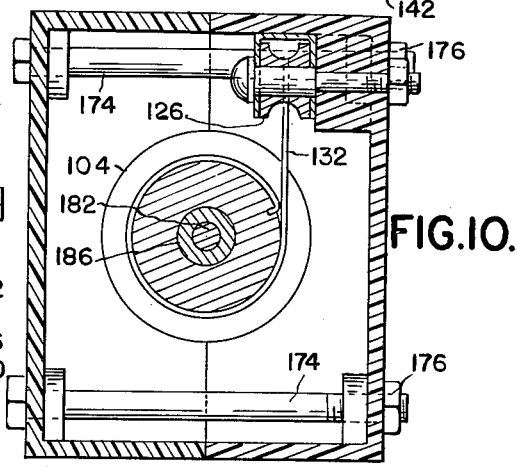
FIGURE 10 is a transverse sectional view taken on line 10—10 of FIGURE 9.

A coil spring or resilient means 120 is interposed between the gear 116 and the face or surface 122 of the pulley 104. One end portion of the coil spring 120 is appropriately anchored or secured to the pulley 104. The spring 120 has an end strand 121 which engages and electrically contacts the fixed shaft 64 as best illustrated in FIGURE 5. The shaft 64, which is adapted to be connected to a source of energy such as a battery, conducts the electrical current through the end strand 121 of the spring 120, through the coil spring 120, and through appropriate fastening means 130 to the armature 102. The coil spring 120 is provided with a loop 128 at the other end thereof. The threaded fastener 130 extends through the loop 129, pulley 104, and into the armature 102 as best illustrated in FIGURE 3. With such as arrangement electrical current is carried from the spring 120 through the loop 129, fastener 130, into the armature 102 so as to continuously energize the armature 102.

The coil spring 120 provides or serves three important functions. First of all, the spring 120 is designed to be extended upon the movement of the shaft 72 so as to bring the teeth 110 of the armature 102 into contact with the teeth 100 on the casing 82, thereby energizing the solenoid 80. The spring 120 is also designed to carry electrical current. In addition, after the solenoid 80 has been de-energized in a manner which will subsequently be described, the coil spring 120 provides a restoring or retracting force which is adapted to pull the pulley 104 and armature 102 away from the solenoid 80.

A relatively small pulley 126, as best illustrated in FIGURE 3, is located beneath the pulley 104 and at one side of the center line thereof. The pulley 126 is rotatably carried by brackets 128 and 130 which are supported by the bottom wall of the housing 50. A cable 132 has the inner end 133 thereof appropriately secured to the pulley 104. Generally a hole is drilled in the pulley 104 and the end 133 of the cable 132 is anchored therein. Approximately one revolution, or a slightly less amount, of cable 132 is wrapped around the pulley 104. The cable 132 extends from the large pulley 104 around the small pulley 126 and outwardly, substantially parallel to the longitudinal axis of the housing 50, through the end wall 70 of the housing 50. The cable 132 then extends through a hollow flexible tube 136 and the outer end 137 thereof emerges from the tube 136. The end 137 is wrapped around another small pulley 140, as best illustrated in FIGURE 1, and then connected to the accelerator pedal 48. The cable 132 which is attached between the pulley 104 and the accelerator pedal 48 is maintained relatively taut such that movement of the accelerator pedal 48 in a downward direction is effective to push on the cable 132 and wind a predetermined amount thereof on the pulley 104. Release of the foot pressure on the pedal 48 is effective to unwind the cable on the pulley 104, it being understood that the cable remains taut.

The amount of travel of the accelerator pedal 48 varies for different automobiles. Generally, the amount of travel is between 2–4 inches. Generally, the cable has approximately 6 inches of play. The hollow flexible tube 136 is appropriately connected to the floor of the vehicle by means of a cable clamp 141.

Since the amount of play in the throttle linkage mechanism will vary for different automobiles, adjustment means are provided for varying the effectiveness or tension of the spring 120. The adjustment means includes the worm gear 116 and a manually operable worm 142. The worm 142 is carried by a shaft 144 which is mounted in the housing 50 as best illustrated in FIGURE 5. One end of the shaft 144 extends outwardly beyond the housing 50 and is provided with a handle or knob 146. Generally, the adjustment mechanism is utilized only after the throttle control device 20 has been installed in the automobile 10. The worm 142 is rotated by means of the handle 146 so as to rotate the gear 116 and thereby take up any play in the spring 120 and to provide the requisite tension therefor.

Figure 7:
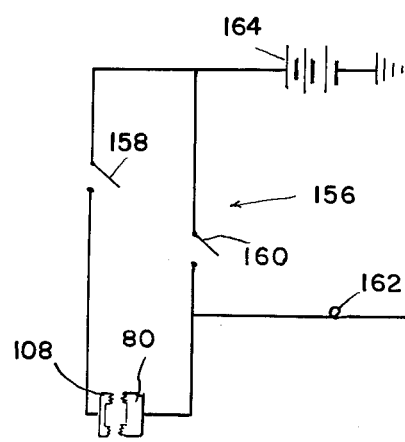
FIGURE 7 is a diagrammatic illustration of the electrical control circuit.
Figure 11:
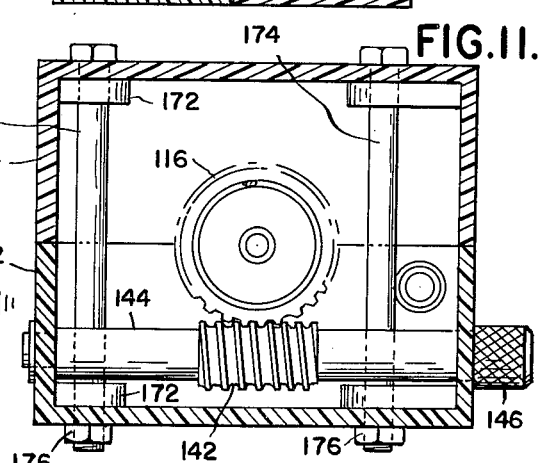
FIGURE 11 is a transverse sectional view taken substantially on line 11—11 of FIGURE 8.

The electrical circuit 156 for the throttle control device 20 is illustrated in FIGURE 7. The circuit 156 includes the usual ignition switch 158, brake light switch 160, and the stop light 162 which is energized upon closing of the switch 160. The power supply or battery is designated by the numeral 164 and is effective upon closing of the ignition switch 158 to direct A+ to the armature 108 through the shaft 64, spring 120 and fastener 130 in the manner previously described.

When the desired throttle setting has been obtained, as an example corresponding to 50 mph., the driver moves the shaft 72 to the right as viewed in FIGURES 2 and 3 through means of the knob 166 which is fastened or secured to the outer end of the shaft 72. The movement of the rod 72 is effective to engage the teeth 110 and 100 provided on the armature 102 and casing 82 respectively thereby completing the electrical circuit to ground through the stop light 162. As a result the solenoid 80 is energized to effectively lock the pulley in place against any movement whatsoever.

When it is required to accelerate, as an example in passing an automobile, the accelerator pedal 48 is depressed. Since the pulley is locked, the cable 132 becomes slack. The pedal 48 is effective to further open the throttle 32 through the usual throttle linkage 46.

After the additional foot pressure has been released from the pedal 48, the throttle returns to the desired throttle setting and the cable 132 becomes taut once again.

The throttle control device 20 may be released in various ways. The opening of the ignition switch 158 will de-energize the solenoid 80. The application of the brakes by applying foot pressure to the brake pedal will close the switch 160 thereby creating a short circuit in circuit 156. The application of the brakes therefore de-energizes the solenoid 80. In addition the shaft 72 may be moved to the left, as viewed in FIGURES 2 and 3, to thereby manually urge the teeth of the armature 108 and casing 82 apart and thereby de-energize the solenoid.

From such a description it is apparent that if any of the wires forming the circuit become loose, a fail safe operation or system is provided since the driver would merely control the throttle setting in the usual manner. The current drain in the solenoid is very small.

It should be understood that the handle 166 is generally made from a plastic material and integrally formed with the rod or shaft 64 which is also made from plastic. The housing 50 is also made from a non-conducting material such as plastic to isolate the parts therein carrying current.

The modification of the invention as disclosed in FIGURES 8–11 is similar to that of FIGURES 3–6 in many respects. All elements which are alike or similar to those of FIGURES 3–6 are identified with like numerals.

The throttle control device 170 illustrated in FIGURES 8–11 is mounted in the same manner in the automobile 10 and operates in substantially the same way as described for the other embodiment.

The upper section 54 and the lower section 52 of the housing 50 are provided on the interior thereof with mounting lugs or embossments 172 on the interior thereof which are adapted to receive elongated threaded bolts 174. The bolts 174 are provided with nuts 176 for securing the sections together. It should be understood that in both embodiments the various sections of the housing 50 may be retained in an assembled relationship by various fastening means.

The solenoid 80 including the casing 82, core 85, bobbin 92 and coil 94 is mounted in the housing 50 in substantially the same manner as in the other embodiment with the exception that the core 85 surrounds an axially movable elongated tubular element 178 which receives the movable rod 180. The rod 180 has the handle 166 on the outer end thereof.

The inner end 182 of the rod 180 is threaded and is threadedly received in a recess 184 provided in a substantially solid core or element 186 which is made from steel. The element 186 may be tapered as illustrated, cylindrical, or of various configurations. The element 186 is arranged to move with the shaft or rod 180. The element 186 is provided with an annular surface 188 located directly opposite and spaced from the annular surface 190 provided on a raised portion of the armature 102.

The pulley 104 is appropriately connected to the armature 102 by means of a fastener such that the pulley and armature are moved together. The pulley 104 and armature 102 are fixedly mounted on the inner end 192 of the tubular element 178. The coil spring 120 has a strand 194 which is anchored in a hole provided in the core or element 186 such that current is conducted through the coil spring 120 to the steel element 186. It should be observed that when the solenoid 80 is not energized the steel element is not in contact with the armature 102.

Figure 9:
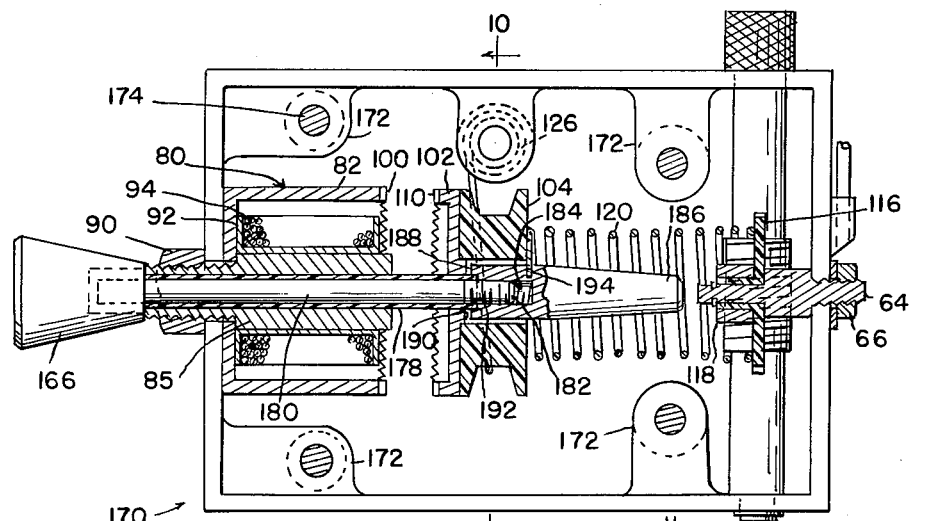
FIGURE 9 is a horizontal sectional view of the throttle control device taken on the line 9—9 of FIGURE 8.
Figure 8:
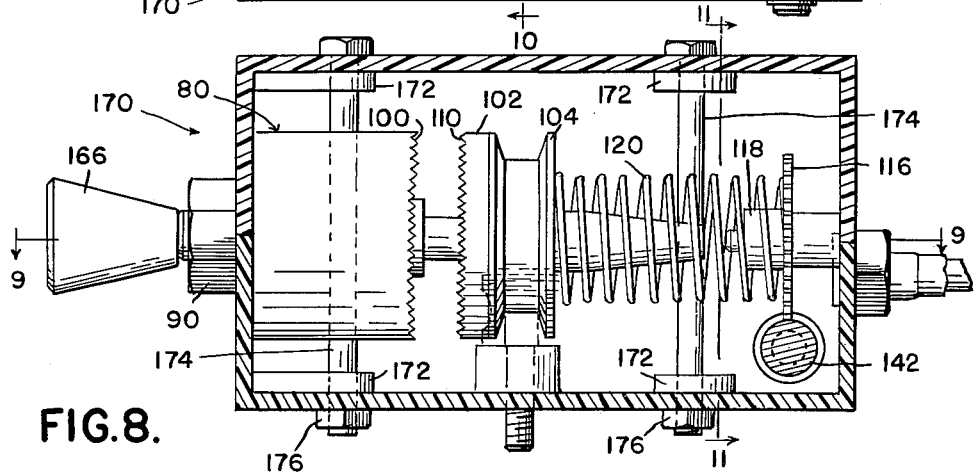
FIGURE 8 is another embodiment of the present invention, with the top wall of the housing removed so as to expose the interior thereof.

When it is required to maintain the throttle setting the rod 180 is moved to the left as viewed in FIGURES 8 and 9 so as to first bring the surface 188 of the steel slug or element 186 into contact with the surface 190 of the armature 102. Thereafter, continued movement of the rod 180 to the left moves the tubular element 178, pulley 104, and armature 102 to the left to interlock the teeth provided on the armature 102 and casing 82 in the same manner as described for the other embodiment.

In the first embodiment in order to manually break the electrical connection it is necessary to overcome the electrical force provided between the teeth of the armature 102 and casing 82. In the second embodiment it is only necessary to break the electrical force provided between the end surface 188 of the steel element 186 and the surface 190 of the armature 102. Since the area between the element 186 and armature 102 is substantially smaller than the area between the teeth provided on the armature and casing a correspondingly smaller force applied to the rod 180 is required to break the electrical force between the element 186 and armature 102 than in the first embodiment.

The spring 120 may be adjusted in the same manner described for the other embodiment after the throttle control device 170 has been installed in an automobile. The solenoid 80 may be de-energized in the same ways described for the first embodiment.

The drawings and the foregoing specification constitute a description of the improved control device for maintaining a predetermined throttle setting in such full, clear, concise and exact terms as to enable any person skilled in the art to practice the invention, the scope of which is indicated by the appended claims.

What I claim as my invention is:

1. A control device for an internal combustion engine having a throttle comprising a housing, a pair of shafts, means mounting one of said shafts in said housing for movement, means mounting the other of said shafts in said housing in a fixed position, a solenoid fixedly mounted in said housing around said one shaft, said solenoid including a casing having a plurality of teeth thereon, an armature mounted on said one shaft and having a plurality of teeth thereon opposite from the teeth on said casing, means operatively connecting said one shaft to the throttle, current carrying extensible resilient means interposed between said other shaft and said armature, and means for moving said one shaft to urge the teeth on said armature into interlocking engagement with the teeth on said casing so as to energize said solenoid, said solenoid when energized being effective to hold said one shaft and armature against movement and to prevent the throttle from closing beyond a predetermined throttle setting.

2. A control device defined in claim 1 wherein said resilient means is effective to disengage the teeth of said casing and said armature upon the de-energization of said solenoid.

3. A control device defined in claim 1 wherein means are provided for varying the effectiveness of said resilient means.

4. A control device defined in claim 3 wherein said last mentioned means includes a rotatable gear on said other shaft to which said resilient means is connected, and a manually operable worm gear carried by said housing for changing the angular position of said gear on said other shaft.

5. A control device defined in claim 1 wherein said extensible resilient means is in the form of a spring.

6. A control device defined in claim 1 wherein said shafts have substantially the same longitudinal axis.

7. A control device defined in claim 1 wherein said means operatively connecting said one shaft to the throttle includes a pulley on said one shaft and a cable on said pulley operatively connected to the throttle, said cable being adapted to rotate said pulley and said one shaft prior to the energization of said solenoid in response to the movement of the throttle.

8. A control device defined in claim 7 wherein said pulley separates said armature from said resilient means, and a threaded fastener extends through a portion of said resilient means, said pulley and into said armature to electrically connect said resilient means to said armature.

9. A control device defined in claim 1 wherein said casing and said armature are provided with an equal number of teeth.

10. A control device defined in claim 1 wherein said one shaft is provided with a manually operable handle which is located exteriorly of said housing.

11. A control device defined in claim 1 wherein said resilient means has a portion thereof in electrical contact with said other shaft which is adapted to be connected to a source of current.

12. A control device defined in claim 1 wherein said solenoid includes a core which surrounds said one shaft, said core having an abutment on the interior of said housing and being provided with a threaded stem which extends through an end wall of said housing, said core being held in a fixed position with respect to said housing by means of a threaded fastener on said stem on the outside of said housing which is effective to draw said abutment against the inside wall of the housing.

13. A throttle positioning system for a motor vehicle having a throttle valve and operator actuated opening mechanism including an accelerator pedal for varying the throttle setting, said system comprising: a solenoid, an electrical circuit comprising a solenoid, a source of electrical energy, a movable armature, and current carrying resilient means interposed between said source of electrical energy and said armature for delivering electricity to said armature; a rotatable pulley operatively connected to said armature; a cable fastened on one end to said pulley and on the other end to said pedal; said pulley being rotated by said cable in response to the movement of said pedal prior to the energization of said solonoid; and means for moving said armature to a position to engage and energize said solenoid upon the attainment of a requisite throttle setting; the energization of said solenoid being effective to prevent said pulley from rotating and thereby effective to prevent said throttle from closing beyond the aforesaid requisite throttle setting.

14. A throttle positioning system defined in claim 13 wherein said last mentioned means includes manually operable means for electrically connecting said armature to said solenoid; said manually operable means also being effective to break the electrical connection between said solenoid and armature.

15. A throttle positioning system defined in claim 13 wherein said electrical circuit includes the ignition switch of the motor vehicle; said solenoid being de-energized by the opening of said ignition switch.

16. A throttle positioning system defined in claim 13 wherein said electrical circuit includes the brake switch of the vehicle; said solenoid being de-energized upon initial actuation of the brake pedal of the vehicle to close said brake switch.

17. A throttle control device for an internal combustion engine having a throttle comprising a rotatable and axially movable shaft means, a solenoid having a plurality of teeth thereon, an armature on said movable shaft means and having a plurality of teeth thereon, means operatively connecting said movable shaft means to the throttle, current carrying extensible resilient means connected to said armature, and means for shifting said movable shaft means to bring the teeth on said armature into interlocking engagement with the teeth on said solenoid so as to energize said solenoid, said solenoid when energized being effective to hold said movable shaft means and armature against movement and to prevent the throttle from closing beyond a predetermined throttle setting until the solenoid has been de-energized.

18. A speed-setting control mechanism for a manually operated speed control pedal comprising movable shaft means, a solenoid having a plurality of teeth thereon, an armature on said movable shaft means and having a plurality of teeth thereon, means operatively connecting said movable shaft means to the control pedal, current carrying extensible resilient means connected to said armature, and means for moving said shaft means to bring the teeth on said armature into interlocking engagement with the teeth on said solenoid so as to energize said solenoid, said solenoid when energized being effective to hold said movable shaft means and armature against movement and to locate said pedal in a selected speed position.

19. The speed-setting control mechanism defined in claim 18 wherein said resilient means is effective to disengage the teeth of said solenoid and said armature upon the de-energization of said solenoid.

20. The speed-setting control mechanism defined in claim 18 wherein means are provided for varying the effectiveness of said resilient means.

21. The speed-setting control mechanism defined in claim 20 wherein said last-mentioned means includes a rotatable gear operatively connected to said resilient means and a manually operable worm gear for rotating said gear.

22. The speed-setting control mechanism defined in claim 18 wherein said extensible resilient means is in the form of a spring.

23. The speed-setting control mechanism defined in claim 18 wherein said solenoid and said armature are provided with an equal number of teeth.

24. A speed-setting control mechanism for a manually operated speed control pedal comprising a housing, a pair of shafts, means mounting one of said shafts in said housing for movement, means mounting the other of said shafts in said housing in a fixed position, a solenoid mounted in said housing around said one shaft, said solenoid including a casing having a plurality of teeth thereon, an armature mounted on said one shaft and having a plurality of teeth thereon opposite from the teeth on said casing, means operatively connecting said one shaft to said control pedal, current carrying extensible resilient means interposed between said other shaft and said armature, and means for moving said one shaft to urge the teeth on said armature into interlocking engagement with the teeth on said casing so as to energize said solenoid, said solenoid when energized being effective to hold said one shaft and armature against movement and to locate said pedal in a selected speed position.

25. The speed-setting control mechanism defined in claim 24 wherein means are provided for varying the effectiveness of said resilient means including a rotatable gear on said other shaft to which said resilient means is connected, and a manually operable worm gear carried by said housing for changing the angular position of said gear on said other shaft.

26. The speed-setting control mechanism defined in claim 24 wherein said shafts have substantially the same longitudinal axis.

27. The speed-setting control mechanism defined in claim 24 wherein said means operatively connecting said one shaft to the control pedal includes a pulley on said one shaft and a cable on said pulley operatively connected to the control pedal, said cable being adapted to rotate said pulley prior to the energization of said solenoid in response to the movement of the pedal.

28. The speed-setting control mechanism defined in claim 27 wherein said pulley separates said armature from said resilient means, and a threaded fastener extends through a portion of said resilient means, said pulley and into said armature to electrically connect said resilient means to said armature.

29. The speed-setting control mechanism defined in claim 24 wherein said resilient means has a portion thereof in electrical contact with said other shaft which is adapted to be connected to a source of current.

30. The speed-setting control mechanism defined in claim 24 wherein said solenoid includes a core which surrounds said one shaft, said core having an abutment on the interior of said housing and being provided with a threaded stem which extends through an end wall of said housing, said core being held in a fixed position with respect to said housing by means of a threaded fastener on said stem on the outside of said housing which is effective to draw said abutment against the inside wall of the housing.

31. A control device for controlling the speed of the engine of a motor vehicle having a stop light circuit including a battery, a brake-actuated switch, and a stop light bulb in series in the order mentioned, and also having a movable speed-regulating element for the engine, said device comprising: a control circuit including the ignition switch connected between one side of the battery and a point in said stop light circuit intermediate said brake-actuated switch and said stop light bulb; a solenoid having its coil connected in said control circuit, said solenoid being operatively connected to said speed-regulating element for controlling the movement thereof; and a manually operable normally opened electrically energized switch including an armature in said control circuit for energizing the coil of said solenoid upon closing of said last mentioned switch and the engagement of said armature with said coil, said coil, and said manually operable switch being in series, current flow normally being from said one side of said battery through said manually operable switch and armature upon the closing of said ignition switch, the coil of said solenoid upon closing of said manually operable switch and the stop light bulb to the other side of the battery, the coil of said solenoid providing sufficient resistance to prevent lighting of the stop light bulb while permitting sufficient current to operate the coil of said solenoid, closing of said brake-actuated switch effecting current flow from said one side of the battery directly through the stop light bulb to the other side of the battery.

References Cited by the Examiner

UNITED STATES PATENTS 2,638,016   5/53   Munson.
2,822,902   2/58   Glick.

DAVID J. WILLIAMOWSKY, *Primary Examiner.*

ROBERT C. RIORDON, *Examiner.*